United States Patent [19]
Dorot

[11] 4,226,307
[45] Oct. 7, 1980

[54] APPARATUS FOR TAKING UP WEAR IN A BRAKE AND BRAKE UTILIZING THIS APPARATUS

[75] Inventor: Henri Dorot, Wattignies, France

[73] Assignee: Verlinde, Societe Anonyme, Loos, France

[21] Appl. No.: 965,413

[22] Filed: Dec. 1, 1978

[30] Foreign Application Priority Data

Dec. 12, 1977 [FR] France ............................. 77 38527

[51] Int. Cl.³ .................... F16D 55/224; F16D 65/52; H02P 3/04
[52] U.S. Cl. ............................ 188/196 V; 188/71.8; 188/171
[58] Field of Search ................. 188/196 V, 171, 71.8; 310/77

[56] References Cited

U.S. PATENT DOCUMENTS

| | | | |
|---|---|---|---|
| 3,357,528 | 12/1967 | Verlinde | 188/171 |
| 3,425,519 | 2/1969 | Frigger | 188/196 V X |
| 3,556,266 | 1/1971 | McCarthy | 188/171 |

FOREIGN PATENT DOCUMENTS 2314483 10/1974 Fed. Rep. of Germany .
1479234 3/1967 France .
2030999 11/1970 France .
95911 1/1972 France .
2390636 12/1978 France .

*Primary Examiner*—Douglas C. Butler
*Attorney, Agent, or Firm*—Kerkam, Stowell, Kondracki & Clarke

[57] ABSTRACT

Apparatus for the automatic compensation for wear in a brake which has floating shoes acting on each side of a disc; has a rear shoe carrying guides parallel to the axis of the disc and these guides pass through the front shoe and a yoke. Each guide carries stops to limit the withdrawal of the yoke and the front shoe and the front shoe and the yoke engage these stops through intermediate wedges. This apparatus is useful for brakes applied by springs and disengaged by electromagnet.

10 Claims, 2 Drawing Figures

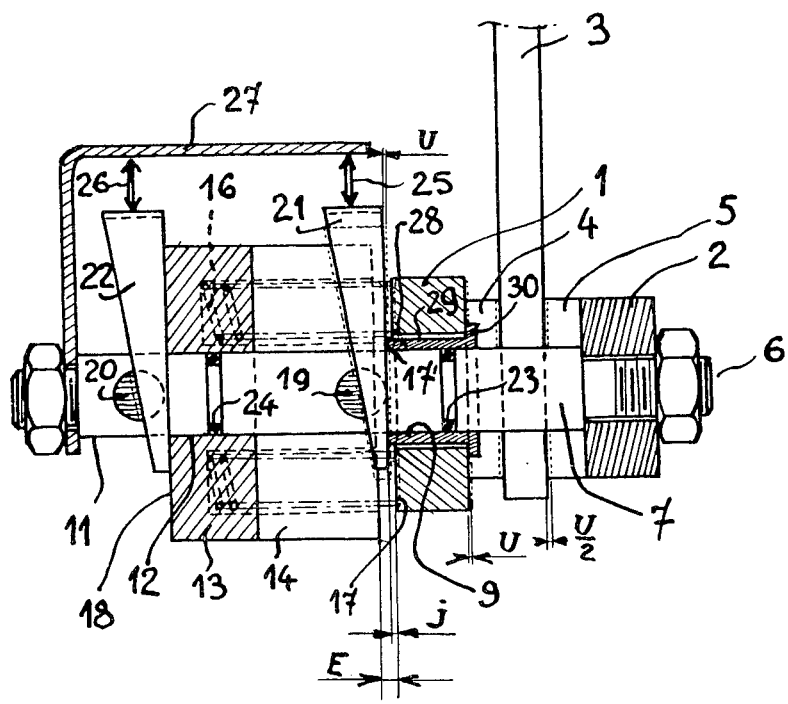
Fig. _1

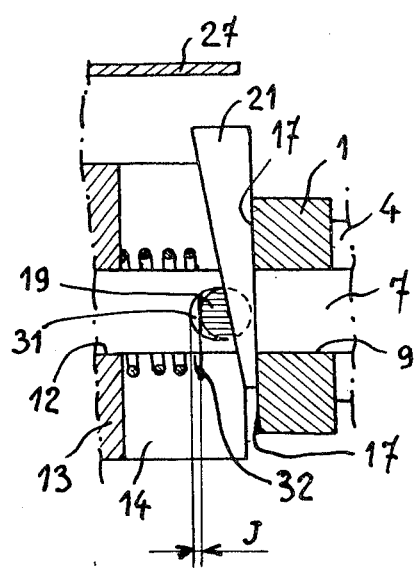
Fig._2

APPARATUS FOR TAKING UP WEAR IN A BRAKE AND BRAKE UTILIZING THIS APPARATUS

BACKGROUND OF THE INVENTION

The present invention relates to apparatus for automatic compensation of wear in a disc brake having floating shoes and to a brake utilizing this apparatus. The present invention more particularly concerns, but not exclusively, such a brake of the type for braking the shaft of an electric motor on which the disc is mounted and in which the release is electromagnetic.

It is known that in this type of brake (French Patent No. 14/79234) the shoes can slide axially with respect to the motor shaft, each on a side of the disc. For this, on one of the shoes, is fixed one of the extremities of the parallel guides parallel to the axis of the shaft and adapted to slide in specially prepared holders, as well as a support fixed to the motor housing while in the other shoe there are two holes receiving these guides which at the extremity opposite to that associated with the first shoe in turn traverses mountings in the yoke of the electromagnet before receiving means preventing withdrawal of the yoke from the guides.

The second shoe, called the front shoe, forms the armature of the electromagnet. Between the front shoe and the yoke of the electromagnet are mounted compression springs. With such a brake, when the electromagnet is energized, the front shoe is drawn toward the yoke and away from the disc which frees the disc.

Compensations means (French Patent No. 77/15458), such as springs interposed between the shoes and on each side of the support are generally known to the end that the front shoe withdraws from the corresponding face of the disc only through a distance substantially equal to one-half of the gap of the electromagnet so that the remaining action of this electromagnet is carried out by the yoke which will then move from the front shoe as from the disc and will thus permit the rear shoe to disengage the other face of the disc by the same spacing.

When the action of the electromagnet ceases, the front shoe directly undergoes the action of compression springs while the rear shoe is indirectly subjected thereto through the guides and these shoes press the disc and provide braking of the motor shaft. By reason of use, the linings of the shoes undergo certain wear and with greater use, on the one hand, the time of response is longer and, on the other hand, the compression springs are less and less compressed and their action becomes less efficient.

At the same time, the air gap increases and from this fact, at a certain time, the magnetic field might become insufficient to draw the armature.

To overcome these inconveniences, these brakes should be provided with means for taking up or compensating for wear which either require manual adjustment (Certificate of Addition French No. 95 911 of French Patent No. 14/79234), which unfortunately requires periodic surveillance of the brakes to measure their wear and so as to act on the various means of adjustment before the wear becomes excessive, or by acting automatically (French Application No. 69/45232 as well as German Application No. 2,314,483) as soon as the wear of the linings reaches a certain level and this is preferable.

In these documents, the means provided for this result, which in fact should limit the withdrawal of the front shoe and of the yoke on the guides, consist, carried by the front shoe and the yoke, of balls or conical washers automatically engaging on the guides when their displacement is carried out in the direction in which they leave the disc of the brake and they free the guides in the opposite direction.

Unfortunately, with these known means, the resulting wedging does not produce an adherent force sufficient to resist the strong axial push necessary for braking.

Further, at rest, vibrations or shocks can displace these washers on the guides and, for example, then prevent them from necessary withdrawal for disengagement of the brake.

To resist strong axial forces, it is known (French Patent No. 77/15458) to provide guides which are not smooth but have saw teeth positively wedging the washers in the appropriate direction.

Unfortunately, to obtain a fine adjustment, the teeth of the rack should have a very small interval so that the face of the stop of each tooth can be sufficiently inclined to tolerate a slight withdrawal of the shoes after passage of a tooth with the result that the disengagement of the brake is incomplete.

The present invention provides apparatus for automatic adjustment of a brake utilizable for motors where the braking force is large which always provides a sufficient play for the disengagement of the shoes.

To this end, the present invention has for an object apparatus of the type described which, to limit the movement of the front shoe and of the yoke with respect to the disc is characterized in that it comprises on each guide two stops and two wedges disposed in such a way that the front shoe and the yoke are so disposed that the face which is away from the disc engages one of these stops through one of the wedges which wedges are urged to interpose automatically, more and more between the face and the corresponding stop whereby these, in accordance with wear, are displaced one with respect to the other, the wedge only providing the displacement.

BRIEF DESCRIPTION OF THE DRAWINGS

The invention will be better understood from the following description, by way of example of preferred embodiments, with respect to the accompanying drawings in which:

FIG. 1 is a schematic cross-sectional view on the axis of a guide of a preferred embodiment of the present invention but without the support and the compensation springs which are known; and FIG. 2 is a view partially in section of another embodiment of the brake of the present invention.

DESCRIPTION OF THE PREFERRED EMBODIMENTS

The brake comprises two rectilinear shoes 1 and 2 acting each on a disc 3 mounted on a motor shaft (not shown). Obviously, between each of the faces of disc 3 and shoe 1 or 2 is interposed a rectilinear brake lining 4 or 5 for example secured on this shoe.

On one of the shoes, the shoe called the rear shoe 2, is fixed one of the extremities (6) of guides 7, one being seen in FIG. 1, parallel to the axis of the motor shaft out of engagement with disc 3 and designed to slide in the housings 9 specially provided in a support (not shown) secured to the motor housing (not shown) and in the other shoe or front shoe 1.

After having passed through the support and the front shoe, these guides, at their extremity 11 opposite to that associated with the rear shoe 2, pass through openings 12 of yoke 13 of an electromagnet 14 before receiving means which will be described hereinafter preventing the withdrawal of yoke 13 from guides 7.

Between front shoe 1, forming the armature of the electromagnet 14, and yoke 13 of this electromagnet, are interposed compression springs 16.

With this brake, when electromagnet 14 is energized, front shoe 1 is drawn toward yoke 13 and separates from disc 3.

Compression springs (not shown) are interposed between shoes 1 and 2 on each side of the support which is located in the plane of the disc. Because of these springs, shoes 1 and 2 symmetrically release disc 3.

With such a brake, during utilization without adjustment, each of linings 4 and 5 undergo a wear U/2 and the value of the gap "E" would become larger and double this wear.

For this reason, the brake requires an adjustment of this gap.

In known manner to obtain automatic adjustment of this gap, the displacement is limited with respect to disc 3 both for front shoe 1 and yoke 13.

To this end, in accordance with one of the characteristics of the present invention, these elements 1 and 13 have each of their faces 17 or 18, which is away from the disc on each guide 7, engaging a stop 19 or 20 carried by the corresponding guide. This engagement is indirect in that it is carried out through a wedge 21 or 22 each progressively engaging the adjacent stop and an adjacent surface 18 (wedge 22) or face 17 (wedge 21).

For example, this progressive engagement can be limited to the action caused by the weight of the wedge, it being understood that the wedge is mounted in the correct sense for this action, that is to say, with its large end above its small end, but in a preferred embodiment, allowing for a mounting without regard to direction of the wedge, the action of the wedge results from the force of an elastic element such as a spring 25 or 26 mounted between the head or large base of the wedge and a mounting 27 fixed to guide 7.

Moreover, it would be equally advantageous to provide means for preventing any excessive displacement of elements 1 and 13 on guides 7, for example, as a result of vibrations or shocks, because such displacement could lead to an excessive penetration of the wedges.

In the example shown in FIG. 1, these means consist each in an O-Ring 23 or 24 of slightly compressible material.

In a preferred embodiment, stops 19 and 20 are orientable so that each is placed correctly with respect to the slope of the wedge.

For example, to this end, these stops will each consist of a piece having a cylindrical profile engaged in a radial opening in the guide and having at least locally a flattened area.

Advantageously, this flattened area will be located in the axial plane of the profile.

As for the wedge, it can be formed by a simple folded sheet metal slide with the guide passing between the branches thereof.

Means are obviously provided so that in spite of the automatic compensation of wear, the gap "E" always remains sufficient for an effective disengagement of the brake. To this end, in the embodiment shown in FIG. 1, the front shoe is mounted on its guide by an integral ferrule 28. The face of ferrule 28 adjacent face 17 has a part 17' through which the shoe engages wedge 21.

This ferrule is itself slidably mounted in a bore 29 in this shoe and, on the other hand, it is terminated at the front, that is at the side of the disc, by a collar 30 forming a stop which, when shoe 1 is in contact, prevents shoe 1 from moving toward the disc without moving ferrule 28 with it and, on the other hand, at its reduced end has a length greater than the thickness of the shoe in an amount equal to "J".

From this fact, when the wedge is bearing on the rear face of the ring, the shoe can still withdraw toward the wedge by this value which is at least sufficient for disengagement of the brake.

In another embodiment (FIG. 2), the provision of a gap sufficient for the disengagement of the brake is obtained because the play "J" in a direction parallel to the axis of the guide 7 is provided for stops 19 of the front shoe by the bore 31 which is provided for them in each guide 7.

To the end that this play is not absorbed by descent of wedges 21, each stop 19 is itself urged toward the front shoe by an elastic element 32 such as a spring mounted on guide 7.

Rather than engaging a piece connected to the guide, this spring will enage by preference on yoke 13 of electromagnet 14 thus avoiding all excessive movement of this yoke without necessitating the use of the toric joints mentioned above.

The force furnished by this spring is just sufficient to resist the inverse force that the stop receives from wedge 12. It is thus very slightly less than the force of compression spring 16 and of the electromagnet 14.

The operation of this brake with automatic adjustment for wear is as follows:

During braking, yoke 13 bears on wedge 22 under the action of compression spring 16, the front shoe 1 is pushed toward the rear shoe 2 so that together they grip disc 3.

If during braking the linings undergo a certain wear, for example, each of the value U/2, shoe 1 receiving the push of springs 16 advances with respect to the guide by the value U which disengages stop 19 from front shoe 1 and permits wedge 21 to further engage (as shown in broken line).

During disengagement of the brake, by reason of the wedge, the front shoe will be able under the action of the electromagnet only to withdraw by the value of play "J" provided by ferrule 28 or by bore 31 (FIG. 2) which is sufficient to free the disc.

By reason of the wear, the front shoe having progressed, the gap "E" is greater than the play "J".

Under the action of the electromagnet, the absorption of the gap "E" being total, after exhaustion of play "J", yoke 13 will approach the front shoe thus moving its rear face 18 from stop 20 allowing wedge 22 to move in to greater engagement.

What I claim is:

1. Automatic apparatus for compensating for wear in a brake with floating front and rear shoes acting on one side and on the other of a disc blocked in translation, comprising at least one guide fixed at one of its extremities to said rear shoe, said at least one guide being parallel to the axis of said disc, said front shoe, and a yoke, being slidably mounted on said at least one guide, means for preventing the escape of said yoke from said guide, means for distributing from one part and the other of the disc the value of the disengagement movement, means for controlling the attraction of said front shoe and said yoke, and, the spacing of said front shoe and said yoke, compensation for wear accruing by limitation of the movement of said front shoe and of said yoke with respect to said disc, being characterized in that it comprises two stops on said at least one guide and two wedges disposed in such a way that for each guide said front shoe and said yoke have their faces which are located away from said disc engaging one of said stops through one of said wedges, and means for urging said wedges to automatically engage more and more between said face and the corresponding one of said stops, whereby in accordance with wear, said wedges separate said yoke and said front shoe.

2. Apparatus as described in claim 1 characterized in that said front shoe is mounted on a ferrule mounted on said at least one guide, a rear face of said ferrule forming a part of said face of said front shoe engaging the adjacent one of said stops, said ferrule being slidably mounted in a bore in said front shoe, a collar for said ferrule forming a stop adjacent said disc and said ferrule having a predetermined greater length than the thickness of said front shoe whereby when said collar acts as a stop, said rear face of said ferrule will project beyond said rear face of said front shoe which will then again be able to withdraw by said predetermined greater length sufficient for disengagement of the brake.

3. Apparatus in accordance with any one of claims 1 or 2 characterized in that said wedges are positioned with a large base above a small base.

4. Apparatus in accordance with any of claims 1 or 2 characterized in that an elastic element is interposed between a large base of said wedges and mounted on a guide.

5. Apparatus in accordance with claim 1 including braking means on said at least one guide for the movement of said yoke and the movement of said front shoe.

6. Apparatus in accordance with claim 1 each of said stops being an element of cylindrical profile engaged in a radial opening in said at least one guide and said element having at least locally a flat surface.

7. Apparatus in accordance with claim 1 each of said wedges being a folded metal piece forming branches, said at least one guide passing between said branches.

8. Apparatus in accordance with claim 1 each of said stops limiting the withdrawal of said front shoe being mounted on said at least one guide with, in a direction parallel to an axis of said guide, a play having a value at least sufficient for disengagement of the brake, said stop being urged toward said disc by an elastic element.

9. Apparatus in accordance with claim 8 said elastic element engaging said yoke.

10. Brake with floating shoes comprising apparatus for compensation for wear in accordance with claim 1.

* * * * *